United States Patent
Foerster et al.

(10) Patent No.: US 12,332,086 B2
(45) Date of Patent: Jun. 17, 2025

(54) SENSOR DEVICE, ELECTRICAL DEVICE HAVING A SENSOR DEVICE, AND VEHICLE HAVING A SENSOR DEVICE

(71) Applicant: TDK Electronics AG, Munich (DE)

(72) Inventors: Philipp Foerster, Berlin (DE); Carsten Dehoff, Berlin (DE)

(73) Assignee: TDK Electronics AG, Munich (DE)

(*) Notice: Subject to any disclaimer, the term of this patent is extended or adjusted under 35 U.S.C. 154(b) by 78 days.

(21) Appl. No.: 17/785,131

(22) PCT Filed: Oct. 27, 2020

(86) PCT No.: PCT/EP2020/080124
§ 371 (c)(1),
(2) Date: Jun. 14, 2022

(87) PCT Pub. No.: WO2021/121744
PCT Pub. Date: Jun. 24, 2021

(65) Prior Publication Data
US 2022/0373370 A1 Nov. 24, 2022

(30) Foreign Application Priority Data

Dec. 19, 2019 (DE) .......................... 102019135221.5
Mar. 13, 2020 (DE) .......................... 102020107007.1

(51) Int. Cl.
*G01D 11/30* (2006.01)
*G01D 11/24* (2006.01)

(52) U.S. Cl.
CPC .......... *G01D 11/30* (2013.01); *G01D 11/245* (2013.01)

(58) Field of Classification Search
CPC .............................. G01D 11/30; G01D 11/245
See application file for complete search history.

(56) References Cited

U.S. PATENT DOCUMENTS

| 10,107,694 | B2 | 10/2018 | Bard et al. |
| 10,436,648 | B2* | 10/2019 | Yoshihara ................ G01K 1/16 |
| 2009/0217864 | A1 | 9/2009 | Stewart et al. |
| 2019/0226918 | A1 | 7/2019 | Hand |
| 2020/0313316 | A1 | 10/2020 | Bhat et al. |

FOREIGN PATENT DOCUMENTS

| CN | 107171082 A | 9/2017 | |
| DE | 102012112323 B3 | 1/2014 | |
| DE | 102013021798 A1 * | 6/2015 | ........... G01D 11/245 |

(Continued)

OTHER PUBLICATIONS

Sumitomo Chemical Co., Ltd., "Grade Lineup Overview of Sumika Super LCP," Super Engineering Plastics, https://web.archive.org/web/20170905121938/http://www.sumitomochem.co.jp:80/sep/products/lcp/lcp_fg_grade.html, Feb. 5, 2025, 4 pages.

Primary Examiner — Jamel E Williams
(74) Attorney, Agent, or Firm — Slater Matsil, LLP

(57) ABSTRACT

In an embodiment a sensor device includes a sensor element in a housing, wherein a mechanical fastening element is arranged and fastened to the housing, the mechanical fastening element including a spring element, wherein the housing includes a plastic having a liquid crystal polymer filled with boron nitride, and wherein the housing includes a base part and a cover part connected to each other, and a cavity in which the sensor element is arranged.

20 Claims, 5 Drawing Sheets

(56) References Cited

FOREIGN PATENT DOCUMENTS

| | | | |
|---|---|---|---|
| DE | 102016119430 A1 * | 4/2018 | ............. G01K 1/143 |
| DE | 102018206985 A1 | 2/2019 | |
| DE | 102017222543 A1 | 6/2019 | |
| EP | 2830179 A2 | 1/2015 | |
| JP | 2003240642 A * | 8/2003 | |
| JP | 2004170246 A | 6/2004 | |
| JP | 2017501404 A | 1/2017 | |
| JP | 2018151349 A | 9/2018 | |
| JP | 2018189587 A | 11/2018 | |
| JP | 7381760 B2 | 11/2023 | |
| WO | 2016120929 A1 | 8/2016 | |

* cited by examiner

SENSOR DEVICE, ELECTRICAL DEVICE HAVING A SENSOR DEVICE, AND VEHICLE HAVING A SENSOR DEVICE

This patent application is a national phase filing under section 371 of PCT/EP2020/080124, filed Oct. 27, 2020, which claims the priority of German patent application 102020107007.1, filed Mar. 13, 2020, and German patent application 102019135221.5, filed Dec. 19, 2019, each of which is incorporated herein by reference in its entirety.

TECHNICAL FIELD

A sensor device, an electrical device having a sensor device, and a vehicle having a sensor device are specified.

SUMMARY

According to at least one embodiment, a sensor device comprises a sensor element.

According to another embodiment, an electrical device comprises the sensor device. Furthermore, the electrical device may comprise an electrical consumer. The sensor device is particularly preferably arranged and fastened to the electrical consumer. The electrical consumer may particularly preferably be an electric motor. Particularly preferably, the electrical device and especially preferably the electrical consumer comprises a mounting element onto which the sensor device is arranged and fastened. Accordingly, the electrical device may comprise an electrical consumer with a mounting element which is intended and configured for the sensor device to be fastened thereto.

According to a further embodiment, a vehicle comprises the sensor device. The vehicle may be a road vehicle, a rail-bound vehicle, a water vehicle or an air vehicle. Particularly preferably, the vehicle is a motor vehicle. In particular, the vehicle may comprise the electrical consumer. The sensor device may be arranged and fastened to the electrical consumer. Accordingly, the vehicle may particularly preferably comprise the electrical device. Furthermore, it may also be possible that the electrical device is part of a device such as a household device, a medical device or an industrial device, wherein the device comprises the electrical consumer and the sensor device and the sensor device is arranged and fastened to the electrical consumer.

The features and embodiments described above and below apply equally to the sensor device, the electrical device, the vehicle, and the device.

The sensor element is particularly preferably a temperature sensor element, so that the sensor device can be intended and configured for temperature measurement. For this purpose, the sensor element may comprise a thermistor material. The thermistor material can, for example, be a high-temperature conductor material or NTC thermistor material (NTC: "negative temperature coefficient") or a low-temperature conductor material or PTC material (PTC: "positive temperature coefficient"). For example, the sensor element may comprise or be a ceramic thermistor element. Such sensor elements may be preferred to measure temperatures for monitoring and control in a wide variety of applications. For example, the sensor element may be formed substantially by a thermistor material, for example, formed in a chip shape, with applied electrical terminals in the form of electrode layers. Furthermore, other sensor types as well as other sensor materials and configurations are also possible.

According to a further embodiment, the sensor device comprises a housing. The sensor element is preferably arranged in the housing and surrounded by the housing. Electrical leads contacting the sensor element are preferably led out of the housing.

Further, the sensor device may be configured and intended to be arranged in proximity to, in indirect contact with, or preferably in direct contact with the electrical consumer. Thus, the electrical device may particularly preferably comprise the sensor device arranged and fastened directly to the electrical consumer.

Particularly preferably, the materials of the sensor device, for example the material of the housing, of the sensor element, of wire contacts, of electrical leads and/or of a potting material, have a high temperature stability. Particularly preferably, all materials of the sensor device have a high temperature stability. For example, the materials of the sensor device may be configured and intended for use at temperatures in a region greater than or equal to −40° C. and less than or equal to 200° C., such that the sensor device can be used in the specified temperature range.

Particularly preferably, the sensor device comprises a high electric strength. This can be particularly advantageous in case the sensor device is arranged near or in indirect contact or in direct contact with a surface of the electrical consumer that carries current and/or exhibits an electrical voltage. Particularly preferably, the sensor device is configured and intended to be operated in proximity or in indirect contact or preferably in direct contact with a surface that may exhibit an electrical voltage of up to 2500 V.

Particularly preferably, the sensor device comprises a short response time. The response time of the sensor device can be characterized, for example, by the response time parameter t63, which is less than or equal to 10 s and, particularly preferably, less than or equal to 5 s. In the case of a sensor device for temperature measurement, in particular t63<5 s may apply to a temperature step between 25° C. and 85° C., wherein the measurement of the parameter may be performed in a liquid.

The housing may be in one piece or in multiple pieces, and in particular may comprise a cavity in which the sensor element is arranged. For example, the housing may comprise a base part and a cover part, which may be connected to each other by a mechanical connection and/or an adhesive connection. The cavity may further comprise, at least in part, a gas, for example air, and/or a potting material, for example a plastic. The potting material, which may for example effect a connection between the parts of the housing, is for example a resin, particularly preferably an epoxy. Alternatively or additionally, other potting materials are also possible. The housing preferably comprises or is made of a plastic. Particularly preferably, the housing, i.e. especially preferably the plastic, comprises a high temperature stability and a high electric strength as described above. Furthermore, it is advantageous if the housing, i.e. particularly preferably the plastic, comprises a high thermal conductivity in the case of a temperature sensor element in order to enable a short response time as described before. Furthermore, the housing, i.e. particularly preferably the plastic, can comprise a high mechanical strength in order to exhibit sufficient stability against mechanical loads during operation.

The plastic can preferably be a thermoplastic. Particularly preferably, the housing comprises or is made of a plastic based on a liquid crystal polymer, LCP for short. Particularly preferably, an LCP is used whose starting polymer can be processed by means of a molding process, i.e., for example, by means of injection molding or extrusion. The plastic may further comprise a filler material. In other words, a filler material, for example in the form of dispersed particles and/or fibers and/or a bound material, may be present in the plastic, i.e. particularly preferably in the LCP. The filler material is, for example, boron nitride. Particularly preferably, the housing comprises or is made of a plastic formed by a thermoplastic material crosslinked with boron nitride and especially preferably strongly crosslinked, particularly preferably an LCP. Such a material may be particularly suitable for providing high thermal conductivity while maintaining high electric strength.

According to a further embodiment, the mounting element is part of a busbar of the electrical consumer or is attached to a busbar of the electrical consumer. Accordingly, at least during operation of the electrical consumer itself, the mounting element may exhibit at least an electrical voltage and/or an electrical current may flow through the mounting element. The mounting element may, for example, be in the form of a tongue, in particular a metal tongue, onto which the sensor device may be slid. The mounting element can thus be led out of a current-carrying rail, for example a copper rail.

According to a further embodiment, the sensor device comprises a mechanical fastening element. In particular, the mechanical fastening element may comprise or be a spring element. Particularly preferably, the mechanical fastening element comprises or is made of a metallic spring element. By means of the mechanical fastening element, a fixation of the sensor device to a mounting element, in particular an electrical consumer, can be achieved. Particularly preferably, in a mounted state of the sensor device the mounting element can be clamped between a part of the housing and a part of the fastening element.

In particular, the mechanical fastening element may be a metallic spring element formed as a metal clamp, for example with or made of stainless steel, such as a CrNi steel. The mechanical fastening element may be arranged and fastened to the housing or a part of the housing. For example, a part of the mechanical fastening element may be surrounded by a part of the housing and/or the mechanical fastening element may grip around a part of the housing, so that the mechanical fastening element is permanently and stably connected with the housing. A resilient restoring force of the mechanical fastening element can ensure constant contact with the mounting element to which the sensor device is attached in the electrical device, so that in the case of a temperature measurement, the surface temperature of the mounting element can be accurately detected.

Furthermore, the mechanical fastening element can comprise a detent element. In the mounted state of the sensor device on the mounting element, the detent element can engage in a detent counter element of the mounting element so that secure fixing of the sensor device on the mounting element can be ensured even under mechanical loads. The detent element can, for example, be embodied as a detent lug and, in a mounted state of the sensor device on a mounting element, engage in a detent counter element designed as a window. Alternatively, the detent counter element can also be embodied as a lug and the detent element can be designed as a window.

Furthermore, the housing or at least a part thereof may comprise at least one mounting guiding element. The at least one mounting guiding element may be selected from one or more inclined insertion surfaces, one or more guiding grooves, one or more bevels. A bevel may preferably be here and hereinafter a chamfer or an angular or circular indentation or protrusion on a corner or a side of the mounting guiding element. Preferably, the housing comprises a plurality of mounting guiding elements as the at least one mounting guiding element. Inclined insertion surfaces and guiding grooves can make it easier to slide the sensor device onto the mounting element. Particularly preferably, the at least one mounting guiding element is formed on the same part of the housing on which the mechanical fastening element is also arranged. The mounting element can comprise, for example, a bevel on one side that is formed as a counterpart to a bevel on one side of the housing. In this way, unintentional incorrect mounting of the sensor device on the mounting element in accordance with the principle known under the term "Poka Yoke" can be avoided in a simple manner. By means of the at least one mounting guiding element, guidance during mounting and/or securing against rotation during mounting can thus be achieved.

The sensor device described herein can particularly preferably be intended and configured to enable an as fast as possible and most accurate temperature measurement of a current-carrying busbar, for example a copper coil, in an electric motor of a vehicle. Compared to the sensor device described herein, previously known measuring systems are complicated to integrate, for example by bonding or overmolding. The system described herein with the sensor device and the mounting element, on the other hand, meets requirements for simple and fast assembly and/or disassembly. Thereby, one or more of the following features may be advantageous in particular:

- a lead-out of the busbar in the form of the mounting element in order to create space for the integration of the sensor device;
- the introduction of a detent counter element, in particular a detent window, into the busbar and in particular into the mounting element for permanently fixing the sensor device;
- the introduction of a detent element, for example in the form of a detent lug in the form of a metallic barbed hook, into the mechanical fastening element of the sensor device for permanently fixing the sensor device in the detent counter element;
- the use of a mechanical fastening element, particularly preferably in the form of a metallic spring element, for introducing a permanent contact pressure between the mounting element and the sensor device;
- the introduction of a double guiding groove as an mounting guiding element in a housing part of the sensor device;
- the introduction of a bevel (by design) on one side in the mounting element and in a housing part of the sensor device, respectively, in order to ensure securing against rotation;
- the use of a thermoplastic material preferably strongly cross-linked with boron nitride, in particular an LCP, as the housing material in order to ensure high thermal conductivity combined with high electric strength.

With the sensor device described herein, a temperature measurement of a metal surface of a busbar of an electric motor can be achieved in a particularly preferred manner. This can be done with a miniaturized design for a highly integrated system. Furthermore, an easy and safe screwless installation can be achieved.

BRIEF DESCRIPTION OF THE DRAWINGS

Further advantages, advantageous embodiments and further developments are revealed by the embodiments described below in connection with the figures, in which.

DETAILED DESCRIPTION OF ILLUSTRATIVE EMBODIMENTS

Figure 1A:
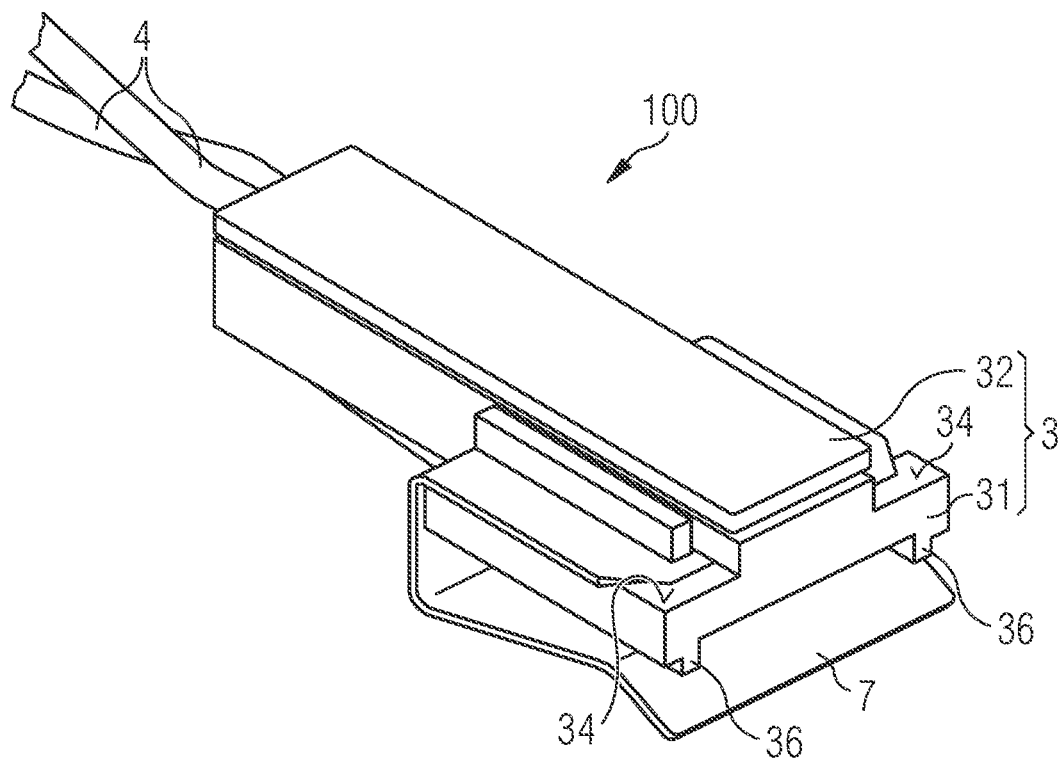
FIGS. 1A to 1H show schematic illustrations of a sensor device according to an embodiment.

In the embodiments and figures, identical, similar or identically acting elements are provided in each case with the same reference numerals. The elements illustrated and their size ratios to one another should not be regarded as being to scale, but rather individual elements, such as for example layers, components, devices and regions, may have been made exaggeratedly large to illustrate them better and/or to aid comprehension.

Figure 1B:
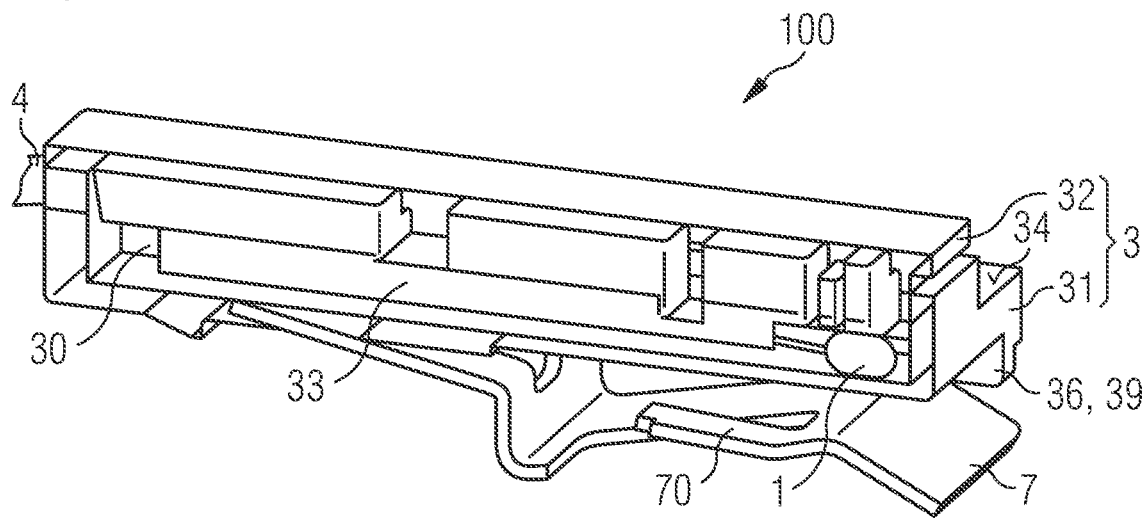
Figure 1C:
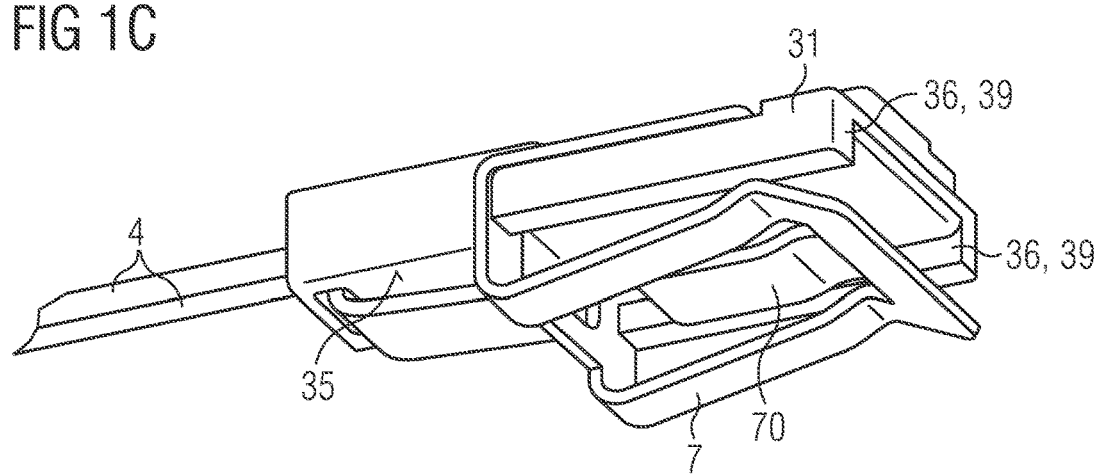
Figure 1D:
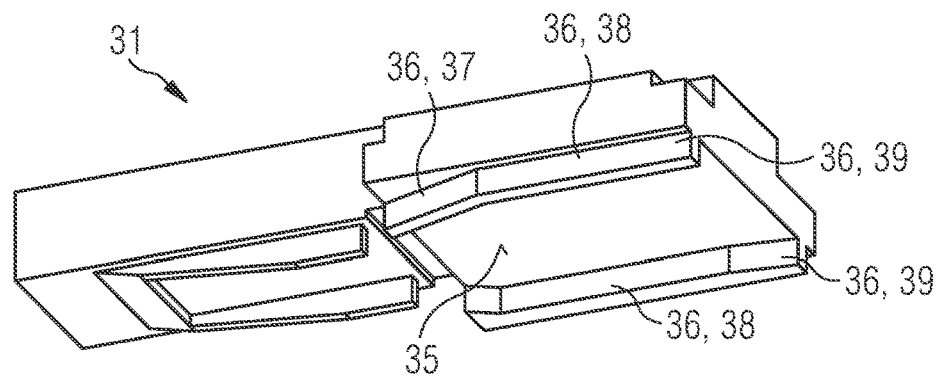
Figure 1E:
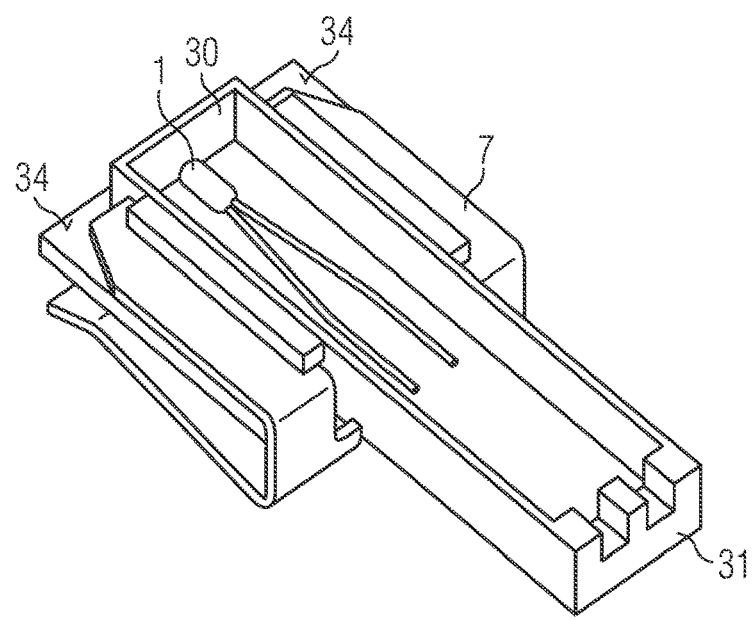
Figure 1F:
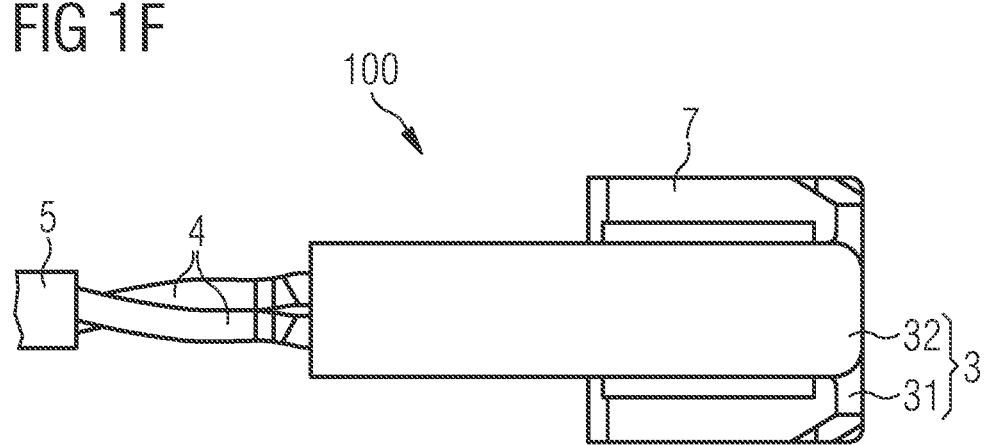
Figure 1G:
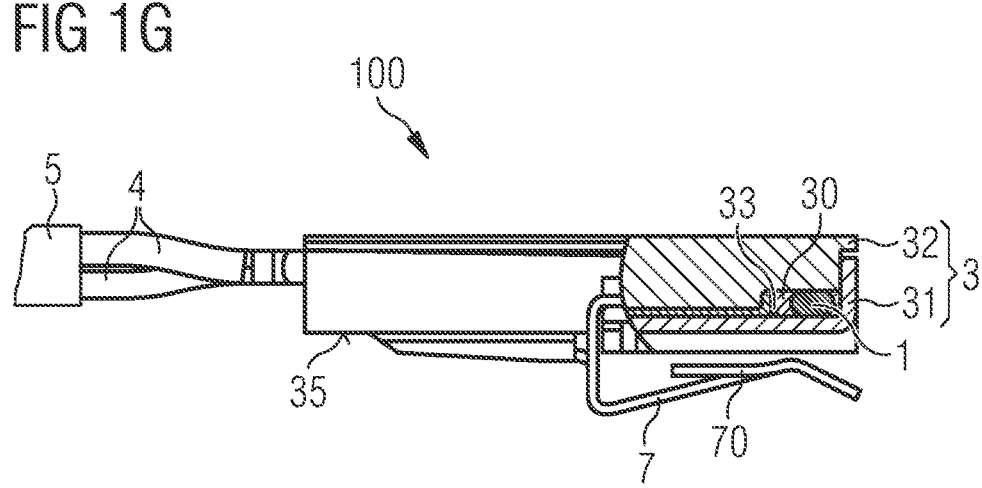
Figure 1H:
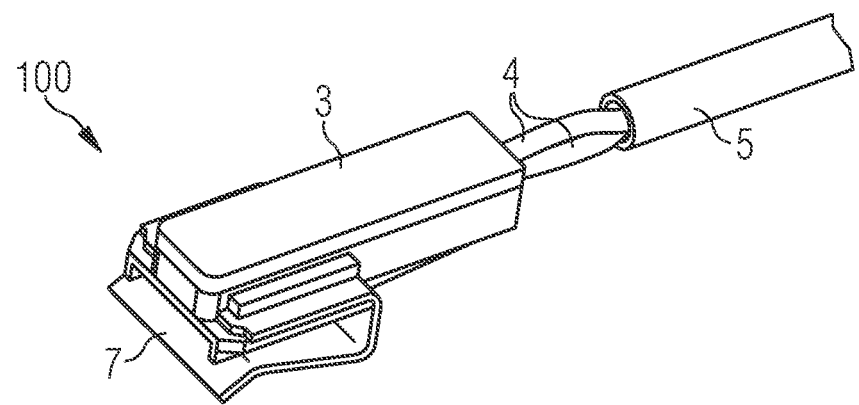

FIGS. 1A to 1H show schematic illustrations of a sensor device 100 or at least parts thereof. FIG. 1A shows a three-dimensional plan view, FIG. 1B shows a partially cut-away three-dimensional view, FIGS. 1C to 1E show three-dimensional views of several components of the sensor device 100, and FIGS. 1F to 1H show further views of the sensor device 100, wherein FIG. 1G shows a partial plan view and a partial cut-away view. The following description refers equally to all of FIGS. 1A to 1H.

The sensor device 100 comprises a sensor element 1. The sensor element 1 may, for example, be formed as a sensor chip. In particular, the sensor element 1 is formed purely by way of example as a temperature sensor element which comprises a thermistor material, for example an NTC or PTC material, in chip form which is provided with electrical terminals in the form of metallizations forming electrode layers. Even though the following description refers to a temperature sensor, the sensor element 1 may alternatively comprise a different functionality and structure, so that the sensor device may also be embodied as a different type of sensor. In the exemplary embodiment shown, the sensor element 1 may in particular be an NTC thermistor element.

The electrical terminals of the sensor element 1 can be electrically contacted via wire connections 2, for example in the form of soldered, of electrically conductively adhered or of bonded wires. The wire connections 2 are, for example, copper-clad FeNi wires. To protect the sensor element 1 and the wire connections 2, they are encapsulated with an encapsulation as shown. The encapsulation may comprise or be made of, for example, a glass and/or a plastic. In the exemplary embodiment shown, it may in particular be an encapsulation with a glass due to temperature stability requirements.

Furthermore, the sensor device 100 comprises a housing 3. The sensor element 1 is arranged in the housing 3 and surrounded by the housing 3. Electrical leads 4 are connected with the wire connections 2, for example by a solder connection, a weld connection or a crimp connection, and are led out of the housing 3. The electrical leads 4 can be guided in a cable sheath 5, which in the exemplary embodiment shown comprises or is made of a fiberglass material, for example, to an electrical connector with corresponding electrical connection elements, via which the sensor device 100 can be connected.

The housing 3 may be in one piece or in multiple pieces and comprises, in particular, a cavity 30 in which the sensor element 1 is arranged. For example, as shown, the housing 3 may comprise a base part 31 and a cover part 32 joined together by a mechanical connection and/or an adhesive connection.

The cavity 30 may be at least partially filled with a gas, for example air, and/or a potting material 33, for example a plastic. The potting material 33 is for example a resin, particularly preferably an epoxy resin. The sensor element 1 and/or at least the wire connections 2 or parts thereof may be embedded in the potting material 33. For this purpose, for example, the base part 31 may comprise a depression, which may form at least part of the cavity 30, as shown in FIG. 1E, or a bearing surface. The sensor element 1 can be placed in or on the depression or on the bearing surface and then the potting material 33 can be applied. The potting material 33 can, for example, also effect a connection between the parts of the housing 3, i.e. in the exemplary embodiment shown between the base part 31 and the cover part 32.

Preferably, the housing 3, i.e. the base part 31 and the cover part 32, comprises a plastic material or is made thereof. Particularly preferably, the housing 3, i.e. particularly preferably the plastic, comprises a high temperature stability and a high electric strength. Furthermore, it is advantageous if the housing 3, i.e. particularly preferably the plastic, comprises a high thermal conductivity. Furthermore, the housing 3, i.e. particularly preferably the plastic, can comprise a high mechanical strength in order to exhibit sufficient stability against mechanical loads during operation.

The plastic is preferably a thermoplastic. In particular, the housing 3 comprises or is made of a plastic based on an LCP. Particularly preferably, an LCP is used whose starting polymer can be processed by means of a molding process, that is, for example, by means of injection molding or extrusion. The plastic further comprises a filler material, which in the exemplary embodiment shown is boron nitride. Accordingly, the base part 31 and the cover part 32 comprise or are made of a plastic formed by a thermoplastic, particularly preferably an LCP, strongly crosslinked with boron nitride.

Due to the materials used, the sensor device 100 is configured and intended to be arranged in proximity to, in indirect contact with, or preferably in direct contact with an electrical consumer.

Particularly preferably, all materials of the sensor device 100, i.e. the material of the housing 3, the sensor element 1 as well as the encapsulation of the sensor element 1, the wire connections 2 and the electrical leads 4 as well as the potting material 33 comprise a high temperature stability. As described in the general part, the materials of the sensor device 100 are selected such that the sensor device 100 can be used in an electrical device where operating temperatures may be present, preferably in a temperature range of greater than or equal to −40° C. and less than or equal to 200° C. Furthermore, the sensor device 100 comprises a high electric strength. Particularly preferably, the sensor device 100 is configured and intended to be operated near or in indirect contact or preferably in direct contact with a surface that may exhibit an electrical voltage of up to 2500 V. Furthermore, the sensor device 100 comprises a short response time, in particular with t63<5 s for a temperature step between 25° C. and 85° C.

Furthermore, the sensor device 100 comprises a mechanical fastening element 7. The mechanical fastening element is embodied as a metallic spring element. By means of the mechanical fastening element 7, a fixation of the sensor device 100 to a mounting element, in particular to a mounting element of an electrical consumer, can be achieved, as further described below.

In particular, the mechanical fastening element 7 can be embodied as a metal clamp, for example with or made of stainless steel, such as a CrNi steel. The mechanical fastening element 7 is fastened to the housing 3 and, in the exemplary embodiment shown, in particular to the base part 31. For example, a portion of the mechanical fastening element 7 may be surrounded by a portion of the housing 3 and/or the mechanical fastening element 7 may engage around a portion of the housing 3 so that the mechanical fastening element is permanently and stably connected to the housing 3. As can be seen, for example, in FIGS. 1A, 1C and 1E, a portion of the mechanical fastening element 7 embraces a portion of the base part 31. For this purpose, the base part 31 comprises corresponding bearing surfaces 34 on the side opposite a bottom side 35. When the sensor device 100 is slid onto a mounting element as described further below, the mechanical fastening element 7 generates a clamping force by which the sensor device 100 can be held securely. In particular, as shown for example below in FIG. 4A, the mounting element is clamped between the bottom side 35 of the housing 3 and the mechanical fastening element 7.

Furthermore, the mechanical fastening element 7 comprises a detent element 70. The detent element 70 can be embodied as shown as a detent lug and, in the mounted state of the sensor device on the mounting element, can engage in a corresponding detent counter element of the mounting element in the form of a window, so that secure fixing of the sensor device on the mounting element can be ensured even under mechanical loads.

Furthermore, the housing 3, in particular the base part 31 in the exemplary embodiment shown, comprises at least one mounting guiding element 36. As can be seen in particular in FIG. 1D, the base part 31 comprises as mounting guiding elements 36 a double guiding groove 38 with inclined insertion surfaces 39 and a bevel 37 on one side. As will be described further below, the mounting element on which the sensor device 100 is mounted also comprises a one-sided bevel formed as a counterpart to the one-sided bevel 37 on the housing 3.

Figure 2A:
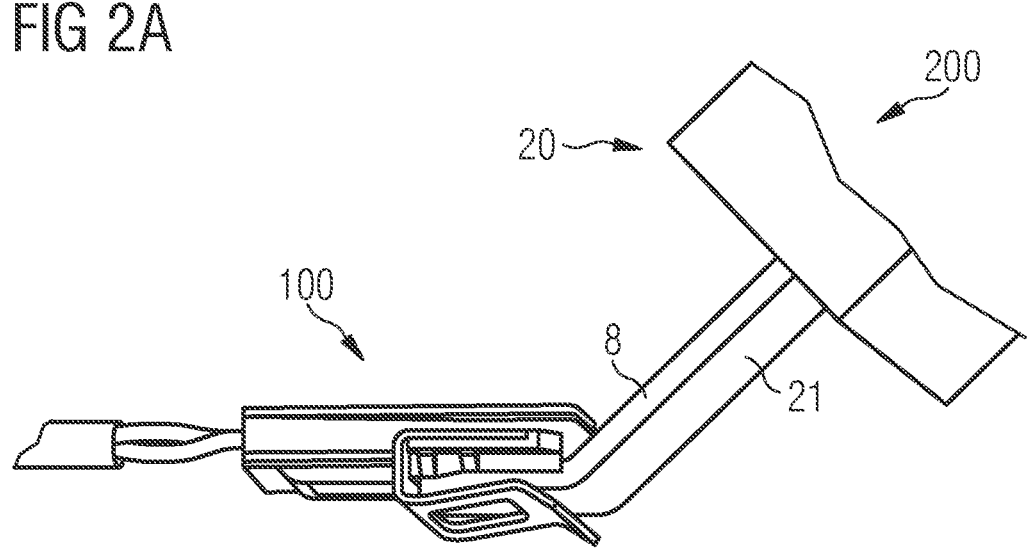
FIGS. 2A and 2B show schematic illustrations of an electrical device and of a vehicle having a sensor device according to a further embodiment.

FIG. 2A shows an electrical device 200 comprising a sensor device 100 as described in the previous exemplary embodiment. Furthermore, the electrical device 200 comprises an electrical consumer 20 to which the sensor device 100 is directly arranged and fastened. The electrical consumer 20 may particularly preferably be an electric motor. The electrical device 200, and in particular the electrical consumer 20, comprises a mounting element 8, described in more detail in connection with FIGS. 3A and 3B, to which the sensor device 100 is arranged and fastened. Due to the resilient restoring force of the mechanical fastening element of the sensor device 100 described above, constant contact with the mounting element 8 can be ensured so that the surface temperature of the mounting element 8 can be accurately detected.

In the exemplary embodiment shown, the mounting element 8 is part of a busbar 21, for example a copper bar, of the electrical consumer 20. Alternatively, the mounting element 8 may be attached to a busbar 21 of the electrical consumer 20. Accordingly, at least during operation of the electrical consumer 20, the mounting element 8 may itself exhibit at least an electrical voltage and/or an electrical current may flow through the mounting element 8.

Figure 2B:
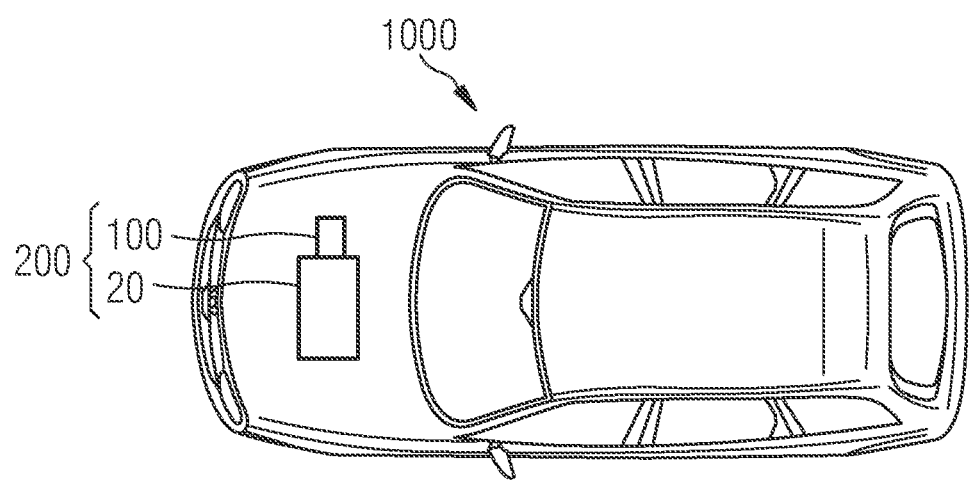

In FIG. 2B a vehicle 1000 comprising the electrical device 200 is shown. Thus, the vehicle 1000 comprises the sensor device 100 and the electrical consumer 20, in particular an electric motor. The vehicle 1000 may be a road vehicle, a rail-bound vehicle, a water vehicle or an air vehicle. Particularly preferably, the vehicle 1000 is a motor vehicle as indicated.

Figure 3A:
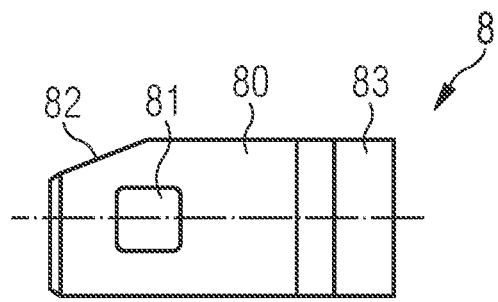
FIGS. 3A and 3B show schematic illustrations of a mounting element for a sensor device according to a further embodiment.
Figure 3B:
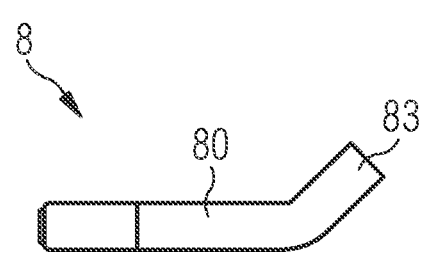

FIGS. 3A and 3B show a top view and a side view of an exemplary embodiment for the mounting element 8. As shown, the mounting element 8 can be formed, for example, in the form of a tongue, in particular a metal tongue, onto which the sensor device 100 can be slid. For this purpose, the mounting element 8 comprises a slide-on region 80 which fits into the region formed by the mounting guiding elements 36 in the bottom side 35 of the housing 3 of the sensor device 100 shown in FIGS. 1A to 1H. With a connection region 83, the mounting element 8 may be attached to the electrical consumer, that is, as previously described, for example, to a busbar. Alternatively, the connection region 83 may also be part of the busbar. The arrangement of the slide-on region 80 relative to the connection region 83, which is bent or kinked, for example by an angle of about 45°, can facilitate mounting of the sensor device 100 on the electrical consumer.

As a counterpart to the detent element 70 of the mechanical fastening element 7 of the sensor device 100, the mounting element 8 comprises a detent counter element 81 which, in the exemplary embodiment shown, is embodied as a window into which the detent element of the sensor device, which is embodied as a detent lug, can engage.

Furthermore, the mounting element 8 comprises a bevel 82 on one side, which is formed as a counterpart to the bevel 37 in the lower side 35 of the housing 3 of the sensor device 100.

Figure 4A:
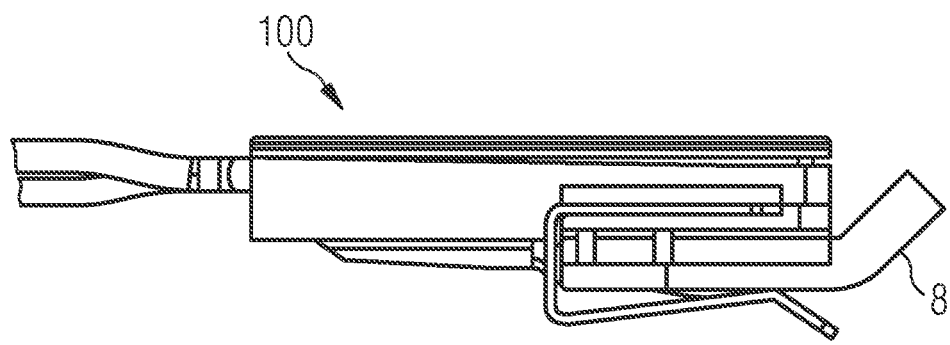
FIGS. 4A and 4B show schematic illustrations of a mounting element and a sensor device according to a further embodiment.

In FIG. 4A, the sensor device 100 is arranged on the mounting element 8 and is, as indicated, fully slid-on. Due to the detent element of the sensor device 100 and the detent counter element of the mounting element 8 as well as due to the clamping force of the mechanical fastening element of the sensor device, a secure and mechanically resilient fixing of the sensor device 100 on the mounting element 8 can be achieved.

Figure 4B:
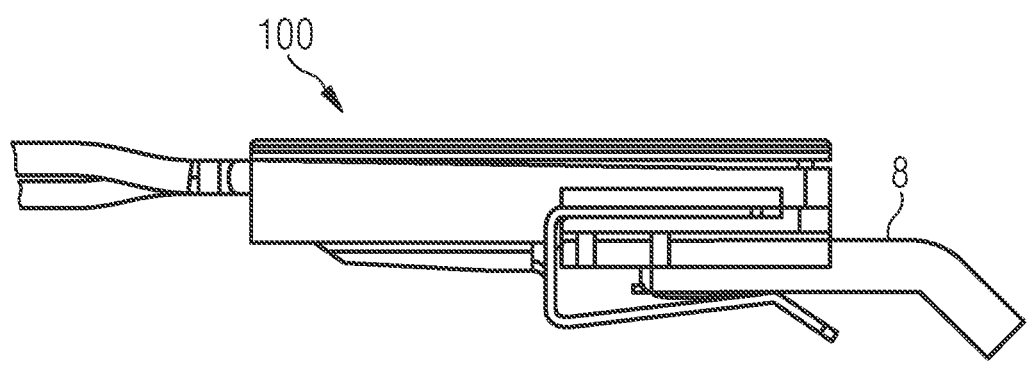

As indicated in FIG. 4B, an unintentional incorrect mounting of the sensor device 100 on the mounting element 8 can be easily avoided by the mounting guiding elements, in particular the one-sided bevel in the bottom side of the sensor device and the corresponding one-sided bevel in the mounting element 8. Thus, the mounting guiding elements of the sensor device 100 can provide guidance during mounting as well as securing against rotation during mounting. Furthermore, in addition, the angled design of the mounting element 8 can enable easy recognition of the correct mounting direction.

The features and embodiments described in connection with the figures can also be combined with one another according to further embodiments, even if not all such combinations are explicitly described. Furthermore, the embodiments described in connection with the figures can alternatively or additionally have further features according to the description in the general part.

The invention is not limited by the description based on the embodiments to these embodiments. Rather, the invention includes each new feature and each combination of features, which includes in particular each combination of features in the patent claims, even if this feature or this combination itself is not explicitly explained in the patent claims or embodiments.

The invention claimed is:

1. A sensor device comprising:
   a housing comprising a base part and a cover part connected to each other;
   a sensor element arranged in a cavity of the housing; and
   a mechanical fastening element arranged and fastened to the housing, the mechanical fastening element comprising a spring element,
   wherein the housing comprises a plastic based on a filled liquid crystal polymer, and
   wherein the filled liquid crystal polymer is filled with boron nitride.

2. The sensor device according to claim 1, wherein the sensor element is a temperature sensor element.

3. The sensor device according to claim 1, wherein the mechanical fastening element comprises a detent element.

4. The sensor device according to claim 1, wherein the housing comprises at least one mounting guiding comprising one or more inclined insertion surfaces.

5. The sensor device according to claim 1, wherein the housing is one piece.

6. The sensor device according to claim 1, wherein the cavity comprises at least partially a potting material.

7. The sensor device according to claim 1, wherein all materials of the sensor device comprise a temperature stability so that they are usable at temperatures at least in a region of greater than or equal to −40° C. and less than or equal to 200° C.

8. The sensor device according to claim 1, wherein the sensor device is configured for operation in direct contact with a surface comprising a voltage of up to 2500 V.

9. An electrical device comprising:
   the sensor device according to claim 1; and
   an electrical consumer,
   wherein the sensor device is arranged at the electrical consumer and fixed by the mechanical fastening element by a clamping force.

10. The electrical device according to claim 9, wherein the electrical consumer is an electric motor.

11. The electrical device according to claim 9, wherein the electrical consumer comprises a mounting element to which the sensor device is arranged and fixed.

12. The electrical device according to claim 11, wherein the mounting element is part of a busbar of the electrical consumer.

13. The electrical device according to claim 11, wherein the mounting element is in a form of a metal tongue onto which the sensor device is slid.

14. The electrical device according to claim 11, wherein the mounting element comprises a detent counter element into which a detent element of the mechanical fastening element is engaged.

15. The electrical device according to claim 11, wherein the mounting element comprises a one-sided bevel formed as a counterpart to a one-sided bevel on the housing.

16. A vehicle comprising:
    the electrical device according to claim 9.

17. The sensor device according to claim 1, wherein the housing comprises at least one mounting guiding comprising one or more guiding grooves.

18. The sensor device according to claim 1, wherein the housing comprises at least one mounting guiding comprising one or more bevels.

19. A sensor device comprising:
    a sensor element in a housing; and
    a mechanical fastening element arranged and fastened to the housing,
    wherein the mechanical fastening element comprises a spring element,
    wherein the housing comprises a plastic comprising a liquid crystal polymer filled with boron nitride,
    wherein the housing comprises a base part and a cover part connected to each other, and a cavity in which the sensor element is arranged,
    wherein the cavity comprises at least partially a potting material, and
    wherein the potting material is an epoxy resin.

20. A sensor device comprising:
    a sensor element in a housing; and
    a mechanical fastening element arranged and fastened to the housing,
    wherein the sensor element is connected via wire connections,
    wherein the sensor element and the wire connections are encapsulated in an encapsulation,
    wherein the mechanical fastening element comprises a spring element,
    wherein the housing comprises a plastic comprising a liquid crystal polymer filled with boron nitride,
    wherein the housing comprises a base part and a cover part connected to each other, and
    wherein the housing forms a cavity, in which the sensor element, the wire connections and the encapsulation are arranged,
    wherein the cavity comprises at least partially a potting material, and
    wherein the potting material is an epoxy resin.

* * * * *